(12) United States Patent
Miyamoto et al.

(10) Patent No.: US 10,576,793 B2
(45) Date of Patent: Mar. 3, 2020

(54) PNEUMATIC TIRE

(71) Applicant: TOYO TIRE & RUBBER CO., LTD., Osaka-shi, Osaka (JP)

(72) Inventors: Takeshi Miyamoto, Osaka (JP); Hiroshi Nashio, Osaka (JP)

(73) Assignee: TOYO TIRE CORPORATION, Itami-shi, Hyogo (JP)

(*) Notice: Subject to any disclaimer, the term of this patent is extended or adjusted under 35 U.S.C. 154(b) by 121 days.

(21) Appl. No.: 15/420,210

(22) Filed: Jan. 31, 2017

(65) Prior Publication Data

US 2017/0232802 A1 Aug. 17, 2017

(30) Foreign Application Priority Data

Feb. 15, 2016 (JP) ................................ 2016-026222

(51) Int. Cl.
 *B60C 13/02* (2006.01)
 *B60C 15/024* (2006.01)
 *B60C 17/00* (2006.01)
(52) U.S. Cl.
 CPC .......... *B60C 13/02* (2013.01); *B60C 17/0009* (2013.01)
(58) Field of Classification Search
 CPC ....... B60C 13/00; B60C 13/001; B60C 13/02; B60C 13/023; B60C 15/024
 See application file for complete search history.

(56) References Cited

U.S. PATENT DOCUMENTS

| 2009/0032161 | A1 | 2/2009 | Yamaguchi |
| 2010/0038001 | A1 | 2/2010 | Yamaguchi |
| 2010/0180994 | A1 | 7/2010 | Yamaguchi |
| 2010/0193102 | A1 | 8/2010 | Tsuruta et al. |
| 2010/0294412 | A1* | 11/2010 | Inoue ...................... B60C 13/02 152/523 |

(Continued)

FOREIGN PATENT DOCUMENTS

| CN | 101909907 A | 12/2010 |
| CN | 102448739 A | 5/2012 |

(Continued)

OTHER PUBLICATIONS

Machine translation of JP 2002-59712, 2002.*

(Continued)

*Primary Examiner* — Justin R Fischer
(74) *Attorney, Agent, or Firm* — Westerman, Hattori, Daniels & Adrian, LLP

(57) ABSTRACT

A pneumatic tire includes a projection formed on a surface of a tire side portion. The projection includes a top surface, and first and second side surfaces respectively forming a side surface in a tire circumferential direction. A first side edge portion, where the top and first side surfaces intersect, has an inclination to a tire radial direction viewed in a tire width direction. A second side edge portion, where the top and second side surfaces intersect, has an inclination to the tire radial direction as viewed in the tire width direction. A first tip end angle made by the top surface and the first side surface on the first side edge portion, and a second tip end angle made by the top surface and the second side surface on the second side edge portion are 100° or less. The rotational direction of the pneumatic tire is not designated.

8 Claims, 13 Drawing Sheets

(56) References Cited

U.S. PATENT DOCUMENTS

2012/0085473 A1     4/2012    Matsuo et al.
2013/0075006 A1     3/2013    Kojima et al.
2015/0360521 A1*   12/2015   Kojima .................. B60C 13/02
                                                                                                                                   152/523

FOREIGN PATENT DOCUMENTS

| CN | 103072435 A | | 5/2013 |
|---|---|---|---|
| JP | 2002-59712 | * | 2/2002 |
| JP | 2008-222006 A | | 9/2008 |
| JP | 2009-29377 A | | 2/2009 |
| JP | 2013-071634 A | | 4/2013 |
| KR | 20060027982 A | | 3/2006 |
| WO | 2007/032405 A1 | | 3/2007 |
| WO | 2008/114668 A1 | | 9/2008 |

OTHER PUBLICATIONS

Office Action dated Jun. 4, 2018, isssued in counterpart Chinese application No. 201710042756.6, with English translation. (12 pages).

Office Action dated Jul. 26, 2018, issued in Chinese application No. 201710056675.1, with English translation counterpart to U.S. Appl. No. 15/420,193. (11 pages).

Office Action dated Sep. 6, 2018 issued in U.S. Appl. No. 15/420,193.

Office Action dated Dec. 17, 2018, issued in U.S. Appl. No. 15/420,193.

Office Action dated Mar. 21, 2019, issued in U.S. Appl. No. 15/420,193.

Office Action dated Jan. 22, 2019, issued in counterpart CN Application No. 201710042756.6, with English translation. (13 pages).

Office Action dated Feb. 22, 2019, issued in CN Application No. 201710056675.1, with English translation. (10 pages: counterpart to U.S. Appl. No. 15/420,193.

Non-Final Office Action dated Jul. 30, 2019, issued in U.S. Appl. No. 15/420,193.

Office Action dated Nov. 19, 2019, issued in counterpart JP application No. 2016-026222, with English translation. (8 pages).

Office Action dated Nov. 19, 2019, issued in JP application No. 2016-026219, with English translation (counterpart to U.S. Appl. No. 15/420,193). (6 pages).

Final Office Action dated Dec. 23, 2019, issued in U.S. Appl. No. 15/420,193. (10 pages).

* cited by examiner

PNEUMATIC TIRE

CROSS-REFERENCE TO RELATED APPLICATIONS

This application claims priority of Japanese Patent Application No. 2016-026222 filed on Feb. 15, 2016, the content of which is incorporated herein by reference.

BACKGROUND OF THE INVENTION

Technical Field

The present invention is related to a pneumatic tire.

Related Art

International Publication WO2007/032405 and International Publication WO2008/114668 disclose a run flat tire where a plurality of projections is formed on tire side portions for air cooling. These projections intend to create turbulence in an air flow on surfaces of the tire side portions along with the rotation of the tire. Due to the creation of turbulence, a velocity gradient of an air flow in the vicinity of the surface of the tire side portion is increased and, hence, a heat radiation property of the tire is enhanced.

SUMMARY

Neither International Publication WO2007/032405 nor International Publication WO2008/114668 discloses the enhancement of a heat radiation property by techniques other than the creation of turbulence in an air flow in the vicinity of a surface of the tire side portion.

It is an object of the present invention to effectively promote heat radiation of a pneumatic tire by air cooling, and thereby enhancing durability of the pneumatic tire.

Inventors of the present invention have made extensive studies on optimization (or maximization) of a velocity gradient of an air flow in a vicinity of a surface of a tire side portion. It has been known that when an object (for example, a flat plate) is disposed in a flow of a fluid, a speed of the fluid is rapidly lowered in the vicinity of a surface of the object due to viscosity of the fluid. Outside a region where the speed of the fluid rapidly changes (a boundary layer), a region where the speed of the fluid is not influenced by viscosity is formed. A thickness of the boundary layer is increased toward a downstream side from a front edge of the object. Although the boundary layer in the vicinity of the front edge of the object is a laminar flow (a laminar-flow boundary layer), the laminar-flow boundary layer is turned into a turbulent flow (a turbulent flow boundary layer) as the laminar-flow boundary layer flows toward a downstream side through a transitional region. Inventors of the present invention have found out that a velocity gradient of the fluid is large in the laminar-flow boundary layer so that heat radiation efficiency from the object to the fluid is high, and have completed the present invention based on such finding. That is, the inventors of the present invention have come up with an idea of applying a high heat radiation property in the laminar-flow boundary layer to air cooling of the pneumatic tire. The present invention has been made based on such a novel idea.

An aspect of the present invention provides a pneumatic tire, comprising a projection formed on a surface of a tire side portion, wherein the projection includes a top surface, a first side surface which is one side surface of the projection in a tire circumferential direction, and a second side surface which is the other surface of the projection in the circumferential direction, a first side edge portion formed by interconnection of the top surface and the first side surface is inclined to a tire radial direction when viewed from a tire width direction, and a second side edge portion formed by interconnection of the top surface and the second side surface is inclined to the tire radial direction when viewed from the tire width direction, and a first tip end angle which is an angle formed by the top surface and the first side surface at the first side edge portion and a second tip end angle which is an angle formed by the top surface and the second side surface at the second side edge portion are respectively equal to or smaller than 100°.

The first side edge portion and the second side edge portion of the projection are inclined with respect to the tire radial direction, and the tip end angle made by the first side edge portion and the second side edge portion is set to 100° or less and hence, the rotational direction of the pneumatic tire is not limited. When the pneumatic tire is rotated with the first side edge portion being on a leading side in the tire rotational direction, at the first side edge portion of the projection, an air flow is divided into a main air flow which flows on the top surface of the projection and a sub air flow which flows on a surface of the tire side portion. When the pneumatic tire is rotated with the second side edge portion being on the leading side in the tire rotational direction, at the second side edge portion of the projection, an air flow is divided into a main air flow which flows on the top surface of the projection and a sub air flow which flows on a surface of the tire side portion. The main air flow on the top surface of the projection forms a laminar flow. An air flow made of a laminar flow (a laminar-flow boundary) has a large velocity gradient and, hence, heat radiation due to air cooling of the top surface of the projection can be effectively promoted.

According to the pneumatic tire of the present invention, when the pneumatic tire is rotated, an air flow is divided by the first side edge portion or the second side edge portion of the projection formed on the surface of the tire side portion, and out of the divided air flows, the main air flow which flows on the top surface becomes a laminar flow and, hence, heat radiation of the pneumatic tire by air cooling is effectively promoted whereby durability of the pneumatic tire is enhanced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Figure 1:
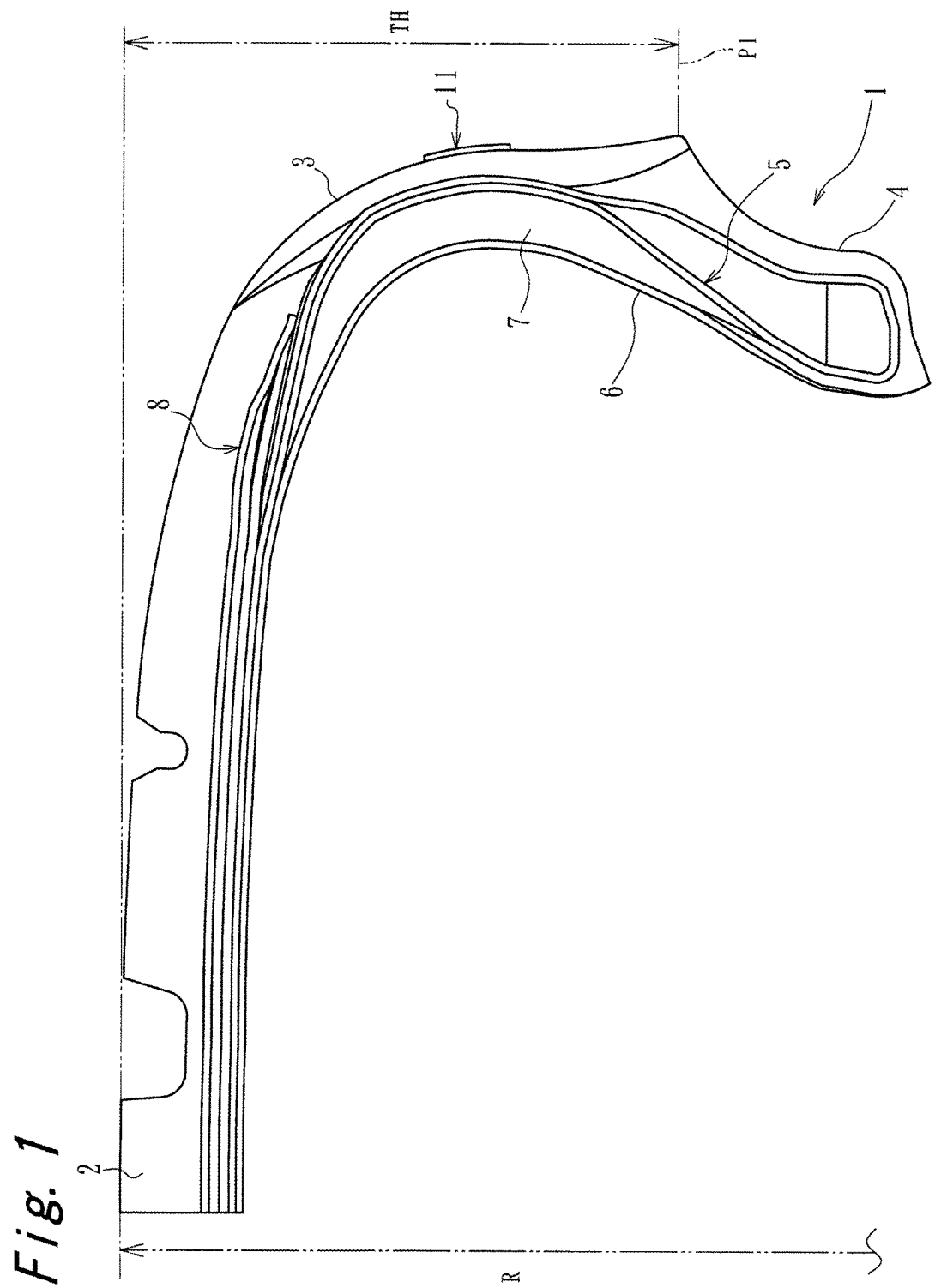
FIG. 1 is a meridian cross-sectional view of a pneumatic tire according to an embodiment of the present invention.

FIG. 1 shows a rubber-made pneumatic tire (hereinafter referred to as a tire) 1 according to an embodiment of the present invention. The tire 1 of this embodiment is a run-flat tire having a size of 245/40R18. The present invention is also applicable to tires having different sizes. The present invention is also applicable to tires not belonging to the category of run-flat tires. A rotational direction of the tire 1 is not particularly designated.

The tire 1 includes a tread portion 2, a pair of tire side portions 3, and a pair of bead portions 4. Each bead portion 4 is disposed on an inner end portion of the tire side portion 3 in a tire radial direction (an end portion on a side opposite to the tread portion 2). A carcass 5 is disposed between the pair of bead portions 4. A reinforcing rubber 7 is disposed between the carcass 5 and an inner liner 6 on an innermost peripheral surface of the tire 1. A belt layer 8 is disposed between the carcass 5 and a tread surface of the tread portion 2. In other words, in the tread portion 2, the belt layer 8 is disposed outside the carcass 5 in a tire radial direction.

Figure 2:
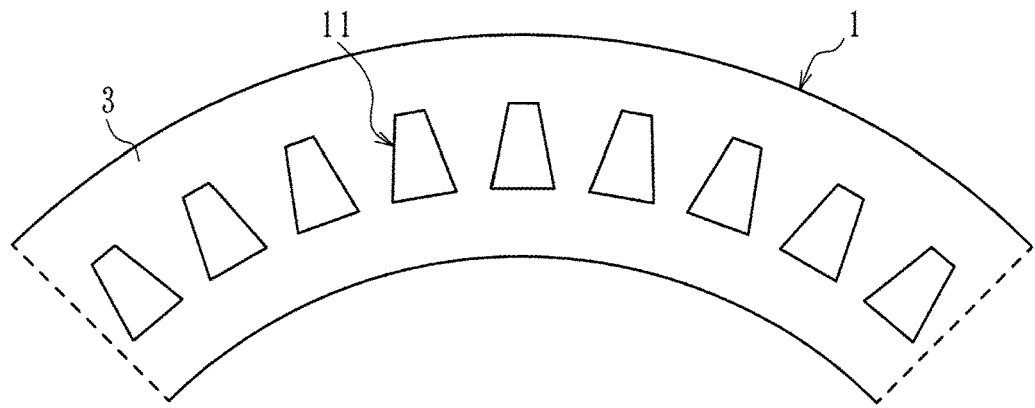
FIG. 2 is a partial side view of the pneumatic tire according to the embodiment of the present invention.
Figure 3:
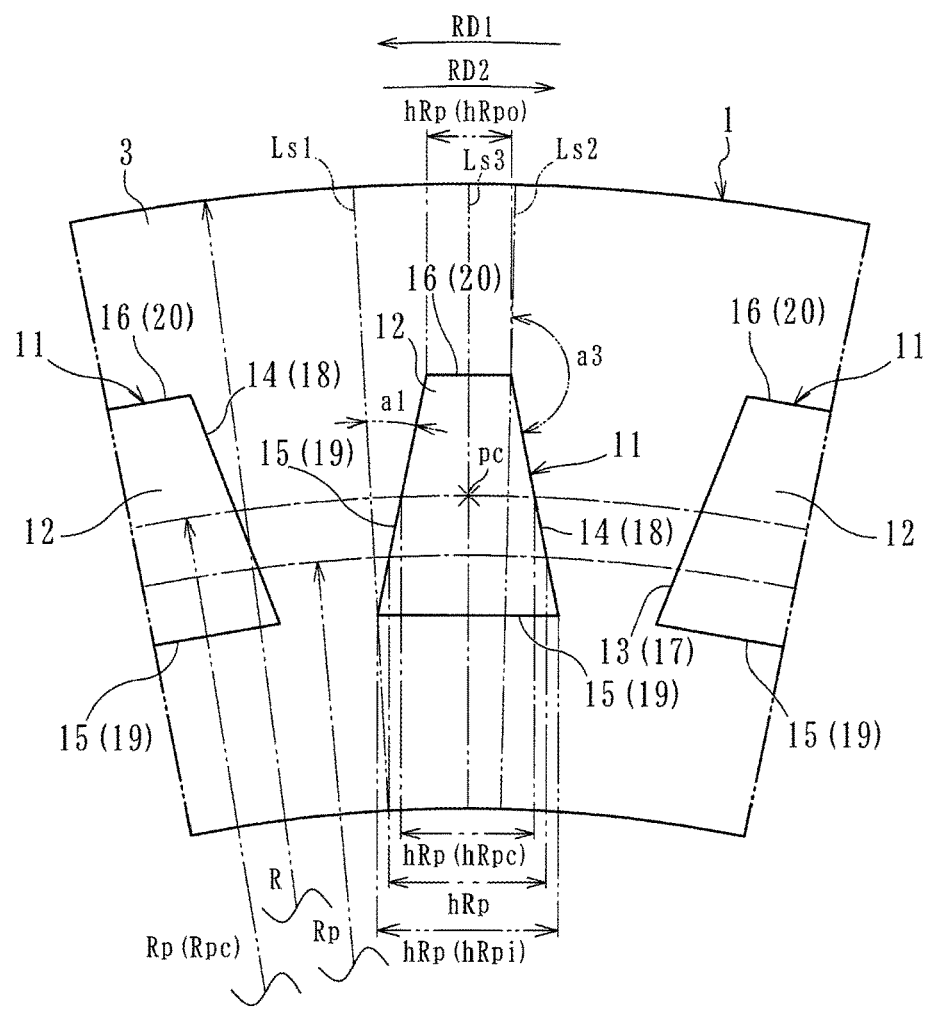
FIG. 3 is a partially enlarged view of the pneumatic tire shown in FIG. 2.

With reference to FIGS. 2 and 3, a plurality of projections 11 is disposed on a surface of the tire side portion 3 at intervals in a tire circumferential direction. In this embodiment, these projections 11 have the same shape, the same size, and the same posture. In FIG. 1, a distance from an outermost peripheral position P1 of a rim (not shown in the drawing) to an outermost position of the tread portion 1 in a tire radial direction (tire height) is indicated by a symbol TH. The projection 11 can be disposed within a range of from 0.05 times to 0.7 times inclusive of the tire height TH from the outermost peripheral position P1 of the rim.

In this specification, a term of "plan view" or terms similar there to may be used with respect to the shape of the projection 11 as viewed in a tire width direction. Further, a term of "end surface view" or terms similar thereto may be used with respect to the shape of the projection 11 as viewed from an inner end surface 15 side described later.

Figure 4:
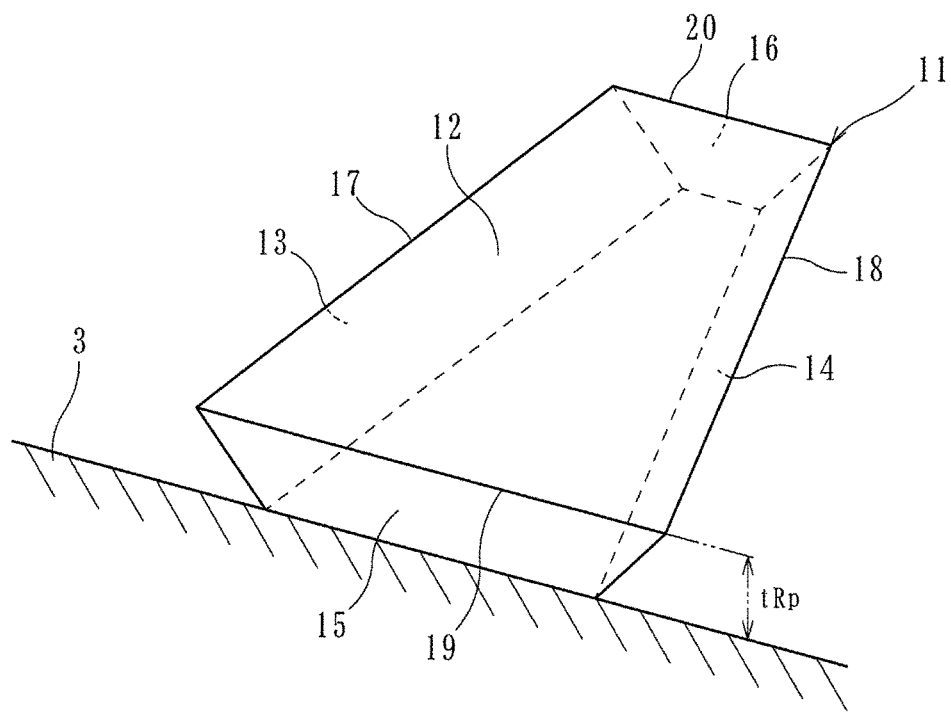
FIG. 4 is a perspective view schematically showing a projection.
Figure 5:
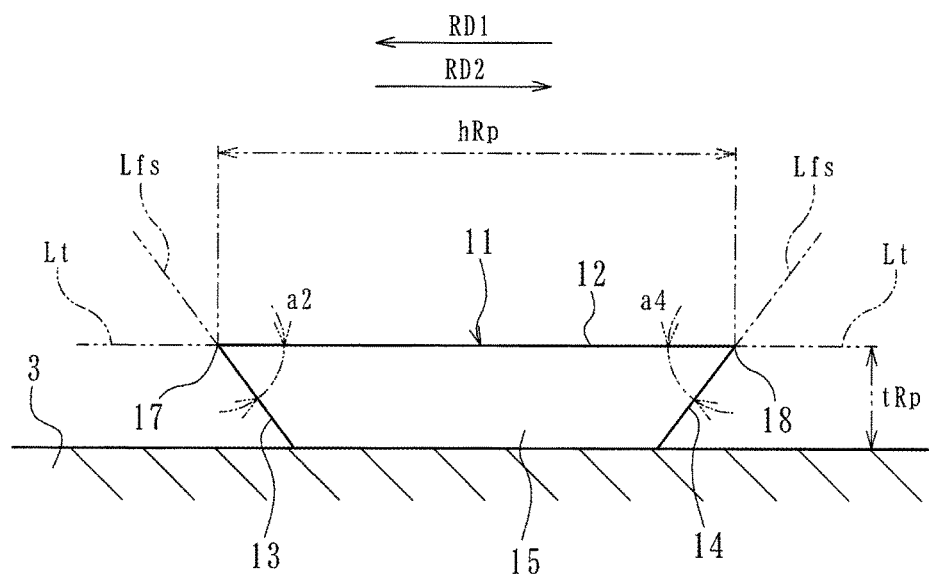
FIG. 5 is an end surface view of the projection.

With reference to FIGS. 4 and 5, in this embodiment, the projection 11 includes a top surface 12 which is a flat surface expanding along a surface of the tire side portion 3. The projection 11 also includes a pair of side surfaces 13, 14 disposed opposite to each other in the tire circumferential direction. In the following description, a first side surface positioned on a left side in the tire circumferential direction in FIGS. 4 and 5 is referred to as a left side surface 13, and a second side surface positioned on a right side in the tire circumferential direction in FIGS. 4 and 5 is referred to as the right side surface 14. The projection 11 also has a pair of end surfaces disposed opposite to each other in the tire radial direction, that is, an inner end surface 15 disposed inside in the tire radial direction, and an outer end surface 16 disposed outside in the tire radial direction. As described later in detail, the left side surface 13 in this embodiment is a flat surface which is inclined with respect to a surface of the tire side portion 3 and the top surface 12. In the same manner as the left side surface 13, the right side surface 14 is also a flat surface which is inclined with respect to the surface of the tire side portion 3 and the top surface 12. In this embodiment, the inner end surface 15 and the outer end surface 16 are flat surfaces extending substantially perpendicular to the surface of the tire side portion 3.

A left side edge portion 17, which forms a first side edge portion, is a portion where the top surface 12 and the left side surface 13 intersect with each other. A right side edge portion 18, which forms a second side edge portion, is a portion where the top surface 12 and the right side surface 14 intersect with each other. An inner side edge portion 19 is a portion where the top surface 12 and the inner end surface 15 intersect with each other. An outer side edge portion 20 is a portion where the top surface 12 and the outer end surface 16 intersect with each other. As in the case of this embodiment, the left side edge portion 17, the right side edge portion 18, the inner side edge portion 19, and the outer side edge portion 20 may be formed of an acute or clear edge. However, these side edge portions may have a shape that is curved to some extent as viewed in an end surface view. In this embodiment, all of the left side edge portion 17, the right side edge portion 18, the inner side edge portion 19, and the outer side edge portion 20 have a linear shape as viewed in a plan view. However, these side edge portions may have a curved shape such as an arcuate shape or an elliptical shape as viewed in a plan view. Further, as shown in FIGS. 14C to 14E, these side edge portions may have a shape formed of a bent line consisting of a plurality of straight lines or may have a shape formed of a combination of one or more straight lines and one for more curved lines.

With reference to FIG. 3, the left side edge portion 17 is inclined with respect to a straight line which passes the left side edge portion 17 and extends in the tire radial direction as viewed in a plan view. In the same manner as the left side edge portion 17, the right side edge portion 18 is inclined with respect to a straight line which passes the right side edge portion 18 and extends in the tire radial direction as viewed in a plan view. In other words, the left side edge portion 17 and the right side edge portion 18 are inclined with respect to the tire radial direction. An inclination angle a1 of the left side edge portion 17 with respect to the tire radial direction is defined as an angle (a clockwise direction being a positive direction as viewed in a plan view) made by a reference straight line Ls1, which passes the position of a left side end of the left side edge portion 17 in the tire circumferential direction and extends in the tire radial direction, and the direction along which the left side edge portion 17 extends (in this embodiment, the left side edge portion 17 per se which is a straight line). An inclination angle a3 of the right side edge portion 18 with respect to the tire radial direction is defined as an angle made by a reference straight line Ls2 which passes a position of a left side end of the right side edge portion 18 in the tire circumferential direction and extends in the tire radial direction and the direction along which the right side edge portion 18 extends. In the above-mentioned configuration, the left side end of the left side edge portion 17 in the tire circumferential direction and the left side end of the right side edge portion 18 in the tire circumferential direction are foremost-side positions in the first tire rotational direction RD1 which are described in detail later. The inclination angles a1, a3 may be defined using the foremost-side positions in the second tire rotational direction RD2 as the references in place of the first tire rotational direction RD1.

The left side edge portion 17 in this embodiment extends rightward and upward from an inner end thereof in the tire radial direction toward an outer end thereof in the tire radial direction as viewed in a plan view. The right side edge portion 18 extends leftward and upward from an inner end thereof in the tire radial direction toward an outer end thereof in the tire radial direction as viewed in a plan view. The left side edge portion 17 and the right side edge portion 18 are symmetrical to each other with respect to a reference straight line Ls3 which passes the center of the projection 11 in the width direction descried later in detail and extends in the tire radial direction. In this embodiment, the inner side edge portion 19 and the outer side edge portion 20 extend substantially parallel to each other as viewed in a plan view.

With reference to FIG. 3, symbol R indicates a tire radius, and symbol Rp indicates a distance from the center of rotation of the tire to an arbitrary position of the projection 11 in the tire radial direction. Symbol Rpc in FIG. 3 indicates a distance from the center of rotation of the tire to the center pc of the projection 11 (for example, a centroid the top surface 12 as viewed in a plan view). Symbol hRp in FIG. 3 indicates a size of the projection 11 in the tire circumferential direction, that is, a width of the projection 11 at an arbitrary position in the tire radial direction. Symbol hRpc in FIG. 3 indicates the width of the projection 11 at the center pc of the projection 11. Symbol hRpi in FIG. 3 indicates the width of the projection 11 at an inner end of the projection 11 in the tire radial direction, and symbol hRpo in FIG. 3 indicates the width of the projection 11 at an outer end of the projection 11 in the tire radial direction.

Further, with reference to FIG. 3, the width hRpi of the projection 11 on an inner end surface 15 side and the width hRpo of the projection 11 on an outer end surface 16 side differ from each other due to setting of the inclination angles a1, a3 of the left side edge portion 17 and the right side edge portion 18. The width hRpi of the projection 11 on the inner end surface 15 side is set larger than the width hRpo of the projection 11 on the outer end surface 16 side. The width hRp of the projection 11 is gradually decreased toward the outer end surface 16 side from the inner end surface 15 side.

Also with reference to FIG. 5, in this embodiment, a thickness tRp of the projection 11 at an arbitrary position of the projection 11 in the tire radial direction is fixed. That is, the projection 11 has the uniform thickness tRp in the tire radial direction. In this embodiment, the thickness tRp of the projection 11 is also fixed from the left side surface 13 (left side edge portion 17) to the right side surface 14 (right side edge portion 18). That is, the projection 11 has the uniform thickness tRp also in the tire circumferential direction.

Figure 6:
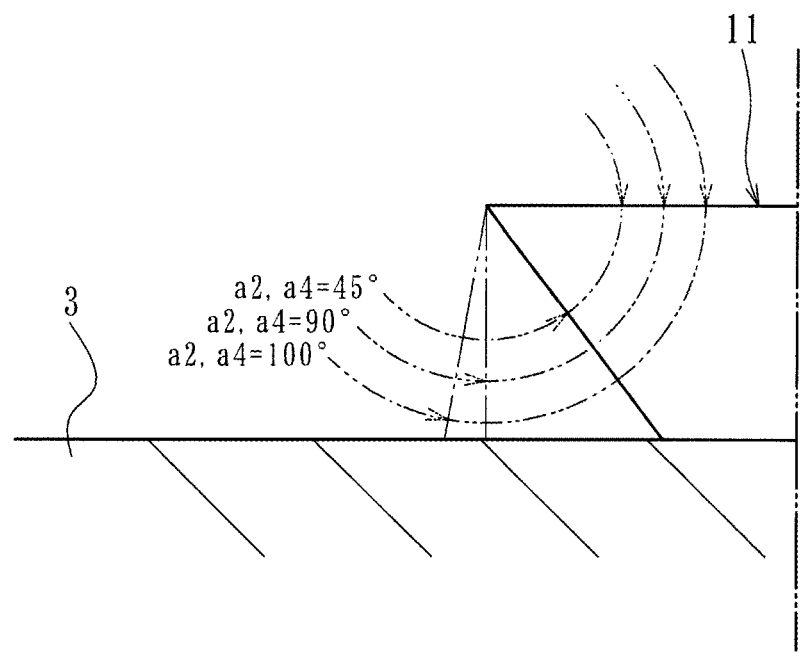
FIG. 6 is a partial end surface view of the projection for describing an angle of a tip end.

With reference to FIGS. 5 and 6, as viewed in an end surface view, the top surface 12 and the left side surface 13 of the projection 11 make a certain angle (first tip end angle a2) on the left side edge portion 17. In this embodiment, the left side surface 13 has an inclination such that a distance between the top surface 12 and the left side surface 13 of the projection 11 is gradually narrowed toward a left side edge portion 17 so as to have a tapered shape. In the same manner as the left side edge portion 17, the top surface 12 and the right side surface 14 of the projection 11 make a certain angle (second tip end angle a4) on the right side edge portion 18. In this embodiment, the right side surface 14 has an inclination such that a distance between the top surface 12 and the right side surface 14 is gradually narrowed toward the right side edge portion 18 so as to have a tapered shape. Since the left side surface 13 and the right side surface 14 have such inclinations, the tip end angles 2a, 4a of the projection 11 in this embodiment are made of an acute angle (45°). The definition of the tip end angles 2a, 4a will be specifically described later.

With reference to FIG. 3, in the tire 1 of this embodiment, the rotational direction of the tire 1 differs depending on whether the tire 1 is mounted on a vehicle as a left tire of the vehicle or as a right tire of the vehicle. The tire 1 mounted on a left side of the vehicle is rotated in the first tire rotational direction RD1 which is a counterclockwise direction in FIG. 3. The tire 1 mounted on a right side of the vehicle is rotated in the second tire rotational direction RD2 which is a clockwise direction in FIG. 3.

When the tire 1 is rotated in the first tire rotational direction RD1, the left side surface 13 is positioned on a leading side in the first tire rotational direction RD1, and the right side surface 14 is positioned on a trailing side in the first tire rotational direction RD1. An inclination direction of the left side edge portion 17 extends rearward in the first tire rotational direction RD1, and an inclination direction of the right side edge portion 18 extends frontward in the first tire rotational direction RD1. With reference to FIG. 5, the inclination of the left side surface 13 is set such that a lower end of the left side surface 13 is positioned behind the left side edge portion 17 in the first tire rotational direction RD1 as viewed in an end surface view.

When the tire 1 is rotated in the second tire rotational direction RD2, the right side surface 14 is positioned on a leading side in the second tire rotational direction RD2, and the left side surface 13 is positioned on a trailing side in the second tire rotational direction RD2. The inclination direction of the right side edge portion 18 extends rearward in the second tire rotational direction RD2, and the inclination direction of the left side edge portion 17 extends frontward in the second tire rotational direction RD2. With reference to FIG. 5, the inclination of the right side surface 14 is set such that a lower end of the right side surface 14 is positioned behind the right side edge portion 18 in the second tire rotational direction RD2 as viewed in an end surface view.

Figure 7A:
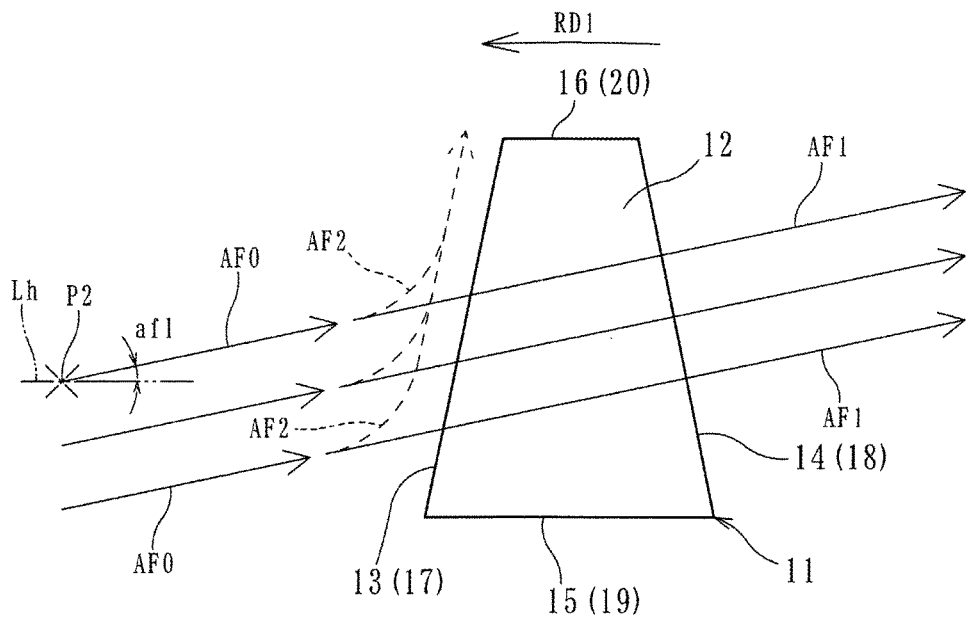
FIG. 7A is a plan view of the projection for explaining an air flow path in a first rotational direction.

As conceptually indicated by an arrow AF0 in FIG. 7A, when the tire 1 is rotated in the first tire rotational direction RD1 along with traveling of a vehicle, an air flow which flows to the projection 11 from a left side edge portion 17 side is generated in the vicinity of the surface of the tire side portion 3. Further, as conceptually indicated by an arrow AF0 in FIG. 7B, when the tire 1 is rotated in the second tire rotational direction RD2 along with traveling of the vehicle, an air flow which flows to the projection 11 from a right side edge portion 18 side is generated in the vicinity of the surface of the tire side portion 3.

Figure 7B:
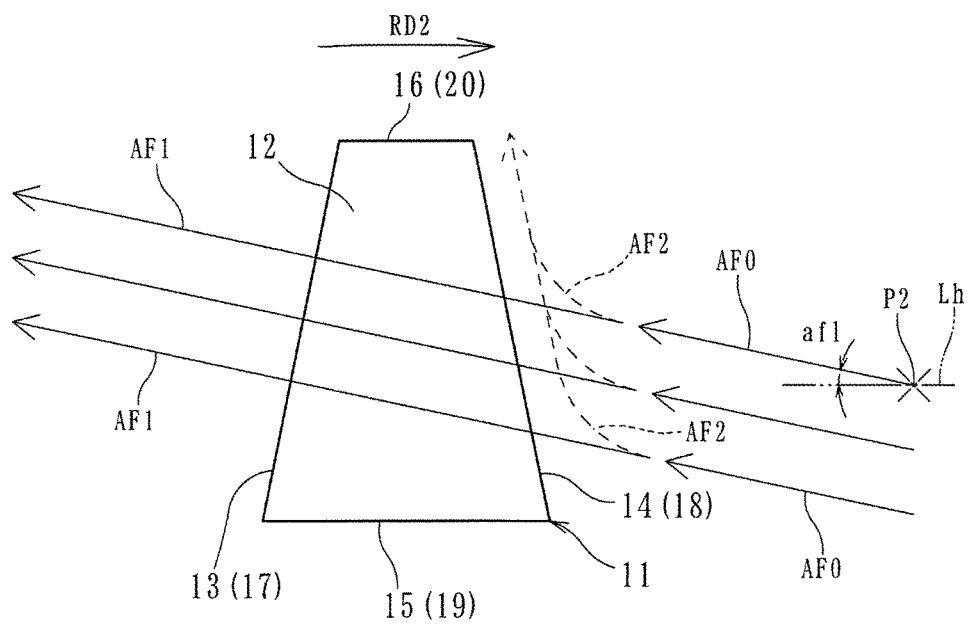
FIG. 7B is a plan view of the projection for explaining an air flow path in a second rotational direction.

With reference to FIGS. 7A and 7B, the air flow AF0 at a specific position P2 on the surface of the tire side portion 3 has an angle (flow-in angle afl) with respect to a perpendicular (horizontal line Lh) drawn from a straight line which passes the position P2 and extends in the tire radial direction. According to a result obtained from an analysis made by the inventors of the present invention, on conditions that a tire size is 245/40R18, a distance Rpc from the center of rotation of the tire to the center Pc of the projection 11 is 550 mm, and a traveling speed of the vehicle is 80 km/h, the flow-in angle afl is 12°. When the traveling speed changes within a range of from 40 to 120 km/h, the flow-in angle afl changes by an approximately ±1°. In an actual use of the tire, the tire is influenced by various factors including a head wind, a structure of the vehicle and the like in addition to a traveling speed and, hence, it is regarded that the flow-in angle afl under the previously-mentioned conditions takes a value which falls within a range of approximately 12±10°.

Hereinafter, the description is made with respect to an air flow in the vicinity of the projection 11 by taking a case where the tire 1 is rotated in the first tire rotational direction RD1 as an example. Also in a case where the tire 1 is rotated in the second tire rotational direction RD2, only the flowing direction of an air flow becomes opposite. Accordingly, it is possible to acquire substantially the same manner of operation and advantageous effects as the case where the tire 1 is rotated in the first tire rotational direction RD1.

Figure 8:
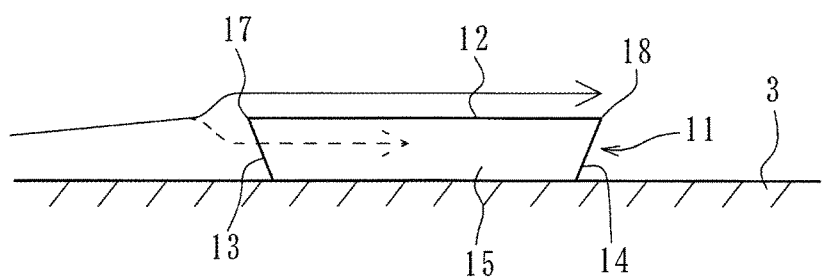
FIG. 8 is an end surface view of the projection for explaining an air flow path.
Figure 9:
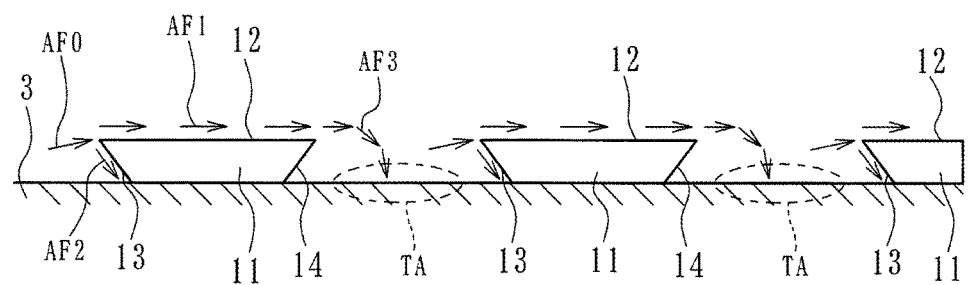
FIG. 9 is a schematic view for describing the projections and an air flow path between the projections.
Figure 12:
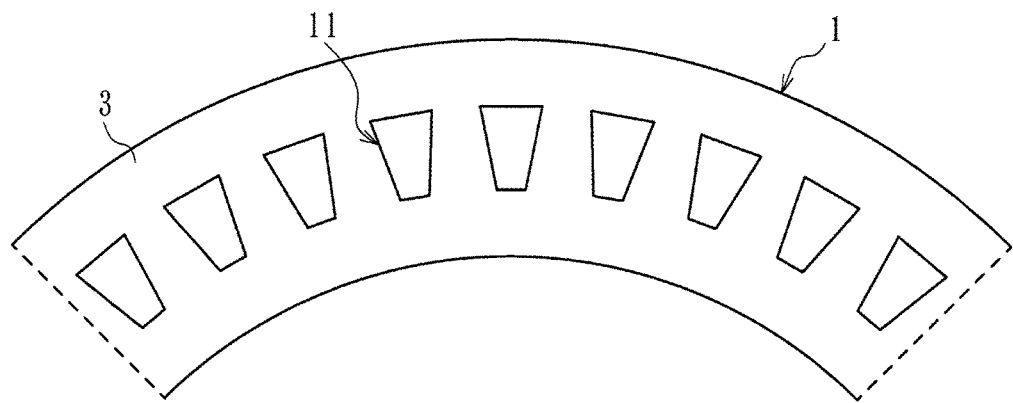
FIG. 12 is a partial side view of a pneumatic tire including projections each having inclination angles of side portions different from inclination angles of side edge portions according to the embodiment.
Figure 13:
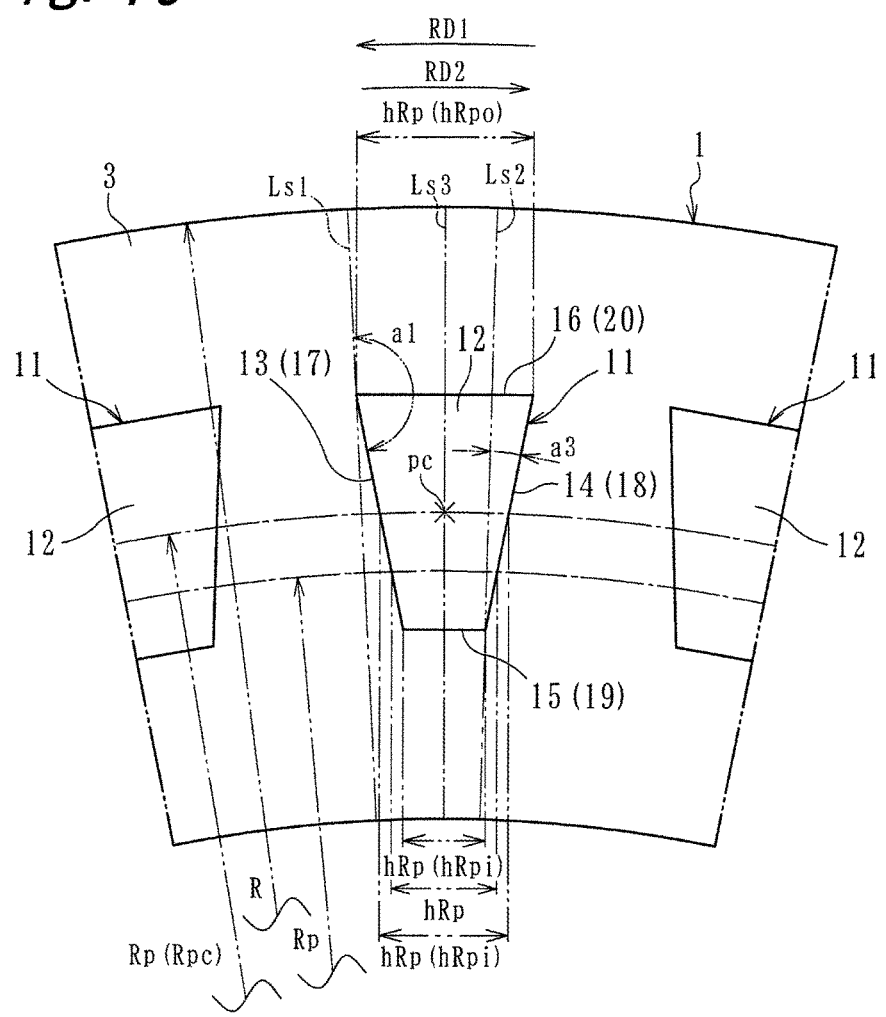
FIG. 13 is a partially-enlarged view of FIG. 11.

With reference to FIGS. 8 and 9 in addition to FIG. 7A, an air flow AF0 flows to the projection 11 from the left side edge portion 17 and is divided into two air flows at the time of flowing into the projection 11. As most clearly shown in FIG. 7A, one air flow AF1 gets over the top surface 12 from the left side surface 13 and flows toward the right side edge portion 18 from the left side edge portion 17 along the top surface 12 (main air flow). The other air flow AF2 flows toward the outside in the tire radial direction along the left side surface 13 (sub air flow). As shown in FIGS. 12 and 13, when the left side edge portion 17 is formed to be extending rightward and downward, the air flow AF2 flows toward the inside in the tire radial direction along the left side surface 13.

Figure 10:
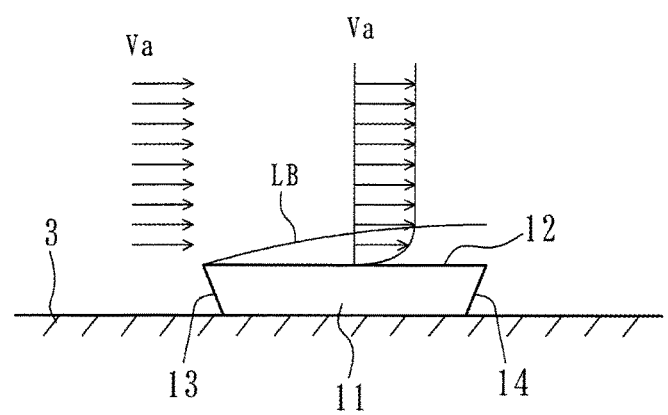
FIG. 10 is an end surface view of the projection for explaining a boundary layer.

Also with reference to FIG. 10, the air flow AF1 which flows along the top surface 12 of the projection 11 forms a laminar flow. That is, a laminar-flow boundary layer LB is formed in the vicinity of the top surface 12 of the projection 11. In FIG. 10, symbol Va conceptually indicates a velocity gradient of the air flows AF0, AF1 in the vicinity of the surface of the tire side portion 3 and in the vicinity of the top surface 12 of the projection 11. Since the air flow AF1 which is a laminar flow has a large velocity gradient, heat is radiated from the top surface 12 of the projection 11 to the air flow AF1 with high efficiency. In other words, the air flow AF1 on the top surface 12 of the projection 11 forms a laminar flow and, hence, heat radiation by air cooling can be effectively promoted. Due to such effective air cooling, durability of the tire 1 is enhanced.

In the tire side portion 3, an inner end surface 15 side of the top surface 12 is a portion which has a smaller tire radius than an outer end surface 16 side of the top surface 12. Accordingly, with respect to an air flow in the vicinity of the top surface 12, a flow speed of the air which flows on the inner end surface 15 side is lower than the flow speed of the air which flows on the outer end surface 16 side. In the boundary layer, the larger a flow speed, the shorter a distance which the boundary layer requires for a growth thereof becomes, and the smaller a flow speed, the longer a distance which the boundary layer requires for a growth thereof becomes. That is, on the inner end surface 15 side of the top surface 12, it is difficult for the boundary layer to grow and, hence, the length of the laminar-flow boundary layer LB becomes long. On the other hand, on the outer end surface 16 side of the top surface 12, the boundary layer easily grows and, hence, the length of the laminar flow boundary layer LB becomes short.

The width hRpi of the projection 11 on an inner end surface 15 side is set larger than the width hRpo of the projection 11 on an outer end surface 16 side. In other words, the width hRpi of the projection 11 on an inner end surface 15 side where the growth of the boundary layer is difficult is made large and the width hRpo of the projection 11 on an outer end surface 16 side where the boundary layer easily grows is made short. The width hRp of the projection 11 is set so as to be gradually narrowed from an inner end surface 15 side to an outer end surface 16 side. Accordingly, it is possible to ensure a proper heat radiation area at respective portions of the projection 11 in the tire radial direction. The width hRpo of the projection 11 on an outer end surface 16 side is not excessively widened and, hence, a volume of the projection 11 can be reduced thus realizing the reduction of the weight of the tire 1.

As indicated by an arrow AF3 in FIG. 9, an air flow which passes along the top surface 12 and flows toward a downstream side from the right side edge portion 18 falls toward the surface of the tire side portion 3 from the top surface 12. The air flow AF3 impinges on the surface of the tire side portion 3. As a result, an air flow in a region TA in the vicinity of the surface of the tire side portion 3 is turned into a turbulent flow between the projections 11, 11 disposed adjacently to each other. In this region TA, due to the increase of a velocity gradient brought about by the formation of the turbulent flow in the air flow, the heat radiation from the surface of the tire side portion 3 is promoted.

As has been described heretofore, in the tire 1 of this embodiment, due to both the formation of a laminar flow in the air flow AF1 on the top surface 12 of the projection 11 and the formation of a turbulent flow in the air flow AF3 between the projections 11, 11, a heat radiation property of the tire 1 is enhanced. Further, because the projection 11 has a laterally symmetrical shape, it is unnecessary to designate the rotational directions RD1, RD2 of the tire 1, and the tire 1 can acquire substantially the same manner of operation and the same advantageous effects when the tire 1 is rotated in either rotational direction.

Figure 11:
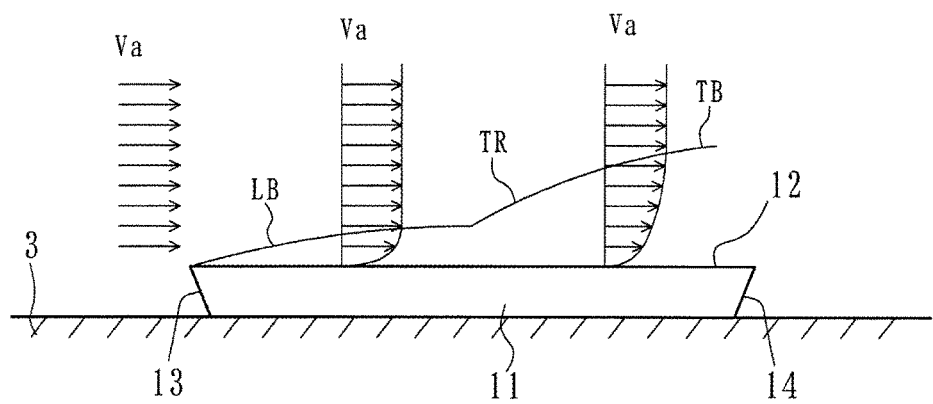
FIG. 11 is an end surface view of the projection for explaining the boundary layer.

As described in detail later, it is desirable that the width hRp of the projection 11 at a position located at a distance Rp from the center of rotation of the tire (see FIG. 3) be set such that a laminar flow boundary layer LB is formed from one of the left side edge portion 17 and the right side edge portion 18 to the other of the left side edge portion 17 and the right side edge portion 18. However, as conceptually shown in FIG. 11, the width hRp of the projection 11 is allowed to have a relatively long size where a velocity boundary layer forms a transitional region TR or a turbulent flow boundary layer TB on the right side edge portion 18 side (a downstream side) of the top surface 12 of the projection 11. Also in this case, in a region of the top surface 12 of the projection 11 where the laminar flow boundary layer LB is formed, the tire 1 can acquire an advantageous effect that a heat radiation property can be enhanced due to a large velocity gradient.

To divide the air flow AF0 into the air flows AF1, AF2 when the air flow AF0 flows to the projection 11 as described above, it is preferable that the thickness tRp of the projection 11, particularly, the thickness tRp of the projection 11 at portions corresponding to the left side edge portion 17 and the right side edge portion 18 be set smaller than the width hp of the projection 11 (or a minimum width when the width hp is not fixed).

As described previously, the air flow AF0 which flows to the projection 11 has a flow-in angle afl. To divide the air flow AF0 into the air flows AF1, AF2, it is necessary to set the inclination angle a1 of the left side edge portion 17 and the inclination angle a3 of the right side edge portion 18 of the projection 11 as viewed in a plan view such that an entry angle of the air flow AF0 with respect to the left side edge portion 17 or the right side edge portion 18 does not become 90°. In other words, as viewed in a plan view, it is necessary to incline the left side edge portion 17 and the right side edge portion 18 of the projection 11 with respect to the air flow AF0.

With reference to FIG. 3, as in the case of this embodiment, when the left side edge portion 17 is inclined rightward and upward as viewed in a plan view, it is preferable to set the left side edge portion 17 such that the left side edge portion 17 intersects with the air flow AF0 which flows to the left side edge portion 17 at an angle of 45°. In this case, as described previously, an entry angle afl of the air flow AF0 is regarded as approximately 12±10° and, hence, it is preferable that the inclination angle a1 of the left side edge portion 17 be set to a value which falls within a range defined by the following formula (1). When the right side edge portion 18 is inclined leftward and upward as viewed in a plan view, in the same manner as the left side edge portion 17, in order to set the right side edge portion 18 such that the right side edge portion 18 intersects with the air flow AF0 which flows into the right side edge portion 18 at an angle of 45°, it is preferable that the inclination angle a3 of the right side edge portion 18 be set to a value which falls within a range defined by the following formula (1').

$$23° \leq a1 \leq 43° \quad (1)$$

$$113° \leq a3 \leq 133° \quad (1')$$

With reference to FIG. 13, when the left side edge portion 17 is inclined rightward and downward, it is preferable that the inclination angle a1 of the left side edge portion 17 be set such that the left side edge portion 17 intersects with the air flow AF0 which flows into the left side edge portion 17 at an angle of 45°. That is, it is preferable that the inclination angle a1 be set to a value which falls within a range defined by the following formula (2). When the right side edge portion 18 is inclined leftward and downward as viewed in a plan view, in the same manner as the left side edge portion 17, to set the right side edge portion 18 such that the right side edge portion 18 intersects with the air flow AF0 which flows into the right side edge portion 18 at an angle of 45°, it is preferable that the inclination angle a3 of the right side edge portion 18 be set to a value which falls within a range defined by the following formula (2').

$$113° \leq a1 \leq 133° \quad (2)$$

$$23° \leq a3 \leq 43° \quad (2')$$

In short, it is preferable that the inclination angle a1 of the left side edge portion 17 be set to satisfy the formula (1) or (2), and the inclination angle a3 of the right side edge portion 18 be set to satisfy the formula (1') or (2'). Further, it is preferable to set the inclination angles a1, a3 such that when the inclination angle a1 of the left side edge portion 17 satisfies the formula (1), the inclination angle a3 of the right side edge portion 18 satisfies the formula (1'), and when the inclination angle a1 of the left side edge portion 17 satisfies the formula (2), the inclination angle a3 of the right side edge portion 18 satisfies the formula (2'). However, as shown in FIG. 14F, the inclination angles a1, a3 may be set such that when the inclination angle a1 of the left side edge portion 17 satisfies the formula (1), the inclination angle a3 of the right side edge portion 18 satisfies the formula (2'), or when the inclination angle a1 of the left side edge portion 17 satisfies the formula (1'), the inclination angle a3 of the right side edge portion 18 satisfies the formula (2).

With reference to FIGS. 5 and 6, to divide the air flow AF0 into the air flows AF1, AF2 when the air flow AF0 flows into the projection 11, it is necessary to prevent tip end angles a2, a4 of the projection 11 from being set to excessively large values. To be more specific, it is preferable that the tip end angles a2, a4 be set to 100° or less. It is more preferable that the tip end angles a2, a4 be set to acute angles, that is, angles which are not more than 90°. It is not preferable that the tip end angles a2, a4 be set to excessively small values because such setting of the tip end angles a2, a4 causes lowering of strength of the projection 11 in the vicinity of the left side edge portion 17. Accordingly, it is preferable that the tip end angles a2, a4 be set to a value which falls particularly within a range of from 45° to 65° inclusive.

With reference to FIG. 3, when the width hRp of the projection 11 at an arbitrary position in the tire radial direction is excessively narrow, an area of heat radiation from the projection 11 by the laminar flow boundary layer LB in the vicinity of the top surface 12 becomes insufficient and, hence, a sufficient heat radiation promoting effect by the laminar flow cannot be acquired. Accordingly, it is preferable that the width hRp of the projection 11 be set to 10 mm or more.

Further with reference to FIG. 3, it is preferable that the width hRp of the projection 11 at an arbitrary position in the tire radial direction be set such that the width hRp satisfies the following formula (3). In all formulae described hereinafter, an SI unit system is used.

$$10 \leq hRp \times \left(\frac{Rp}{R}\right) \leq 50 \quad (3)$$

R: tire radius

Rp: distance from the center of rotation of tire to arbitrary position on projection hRp: width of projection at position away from the center of rotation of tire by distance Rp When the width hRp is excessively small, a region where the velocity gradient is increased cannot be sufficiently ensured so that a sufficient cooling effect cannot be acquired. A lower limit value "10" in the formula (3) corresponds to a minimum required heat radiation area for ensuring a heat radiation promoting effect by the laminar flow.

When the width hRp is excessively large, the velocity boundary layer grows excessively on the projection 11 so that a velocity gradient becomes small thus deteriorating a heat radiation property of the tire 1. An upper limit value "50" in the formula (3) is defined from such a viewpoint. Hereinafter, the reason why the upper limit value is set to 50 is described.

It has been known that the growth of a velocity boundary layer on a flat plate, that is, the transition from the laminar flow boundary layer LB to the turbulent flow boundary layer TB is expressed by the following formula (4).

$$x \cong 3 \times 10^5 \frac{v}{U} \quad (4)$$

x: distance from tip end of flat plate at which transition from laminar flow boundary layer to turbulent flow boundary layer occurs
U: flow-in velocity
v: kinematic velocity coefficient of fluid To take into account the influence of turbulence in a main flow and the lowering of a velocity gradient due to the growth of a boundary layer to some extent in the vicinity of the transition region, it is considered that a maximum value hRp_max of the width hRp of the projection 11 necessary for acquiring a sufficient cooling effect is approximately ½ of the distance x in the formula (4). Accordingly, the maximum width hRp_max of the projection 11 is expressed by the following formula (5).

$$hRp\_max \cong 1.5 \times 10^5 \frac{v}{U} \quad (5)$$

A flow-in speed U of a fluid to the projection 11 is expressed as a product of a distance Rp from the center of rotation of the tire to an arbitrary position of the projection 11 in the tire radial direction and a tire angular velocity (U=Rpω). A vehicle speed V is expressed as a product of a tire radius R and the tire angular velocity (V=Rω). Accordingly, the relationship expressed by the following formula (6) is established.

$$U = \frac{Rp}{R} V \quad (6)$$

With respect to a kinematic viscosity coefficient v of air, the following formula (7) is established.

$$v \cong 1.5 \times 10^{-5} \quad (7)$$

The following formula (8) is obtained by incorporating the formulae (6), (7) into the formula (5).

$$hRp\_max \cdot \frac{Rp}{R} \cong \frac{2.25}{V} \quad (8)$$

Assuming a vehicle speed V as 80 km/h, hRp_max is expressed by the formula (8).

$$hRp\_max \cdot \frac{Rp}{R} \cong 100 (mm)$$

To take into account a condition of traveling at a high speed where heat generation of the tire 1 becomes more outstanding, to be more specific, to take into account a vehicle speed V up to 160 km/h, hRp_max is expressed by the formula (8).

$$hRp\_max \cdot \frac{Rp}{R} \cong 50 (mm)$$

In this manner, to form the laminar flow boundary layer LB over the entire top surface 12 of the projection 11 in the width direction even during a state of traveling at a high speed (vehicle speed V: 160 km/h or below), an upper limit value of the formula (3) becomes 50.

FIGS. 12 to 14F show various alternatives of the shape of the projection 11 as viewed in a plan view.

The projection 11 shown in FIGS. 12 and 13 has, as described previously, the left side edge portion 17 extending rightward and downward as viewed in a plan view, and the right side edge portion 18 extending leftward and downward as viewed in a plan view.

Figure 14A:
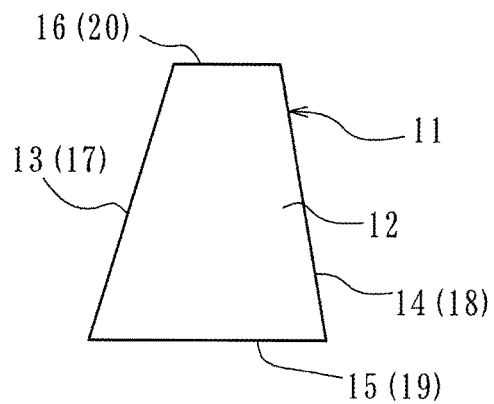
FIG. 14A is a view showing an alternative of a shape of the projection as viewed in a plan view.

The projection 11 shown in FIG. 14A has a trapezoidal shape as viewed in a plan view where an inclination angle a1 of the left side edge portion 17 and an inclination angle a3 of the right side edge portion 18 are set such that the left side edge portion 17 and the right side edge portion 18 are asymmetrical with each other.

Figure 14B:
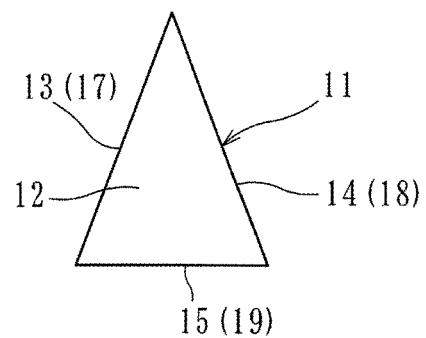
FIG. 14B is a view showing another alternative of the shape of the projection as viewed in the plan view.
Figure 14C:
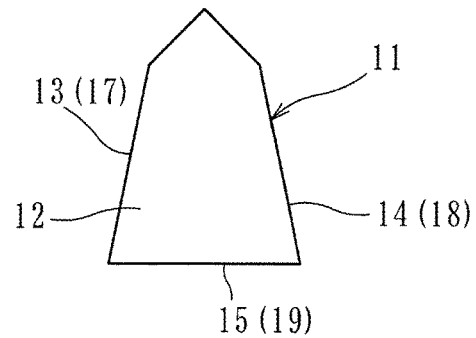
FIG. 14C is a view showing still another alternative of the shape of the projection as viewed in the plan view.
Figure 14D:
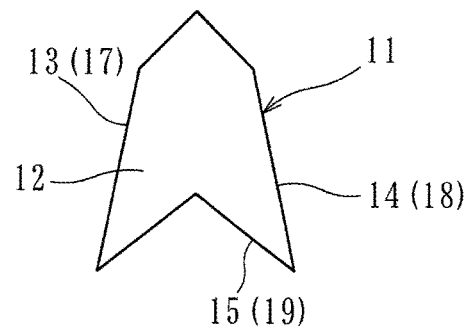
FIG. 14D is a view showing still another alternative of the shape of the projection as viewed in the plan view.
Figure 14E:
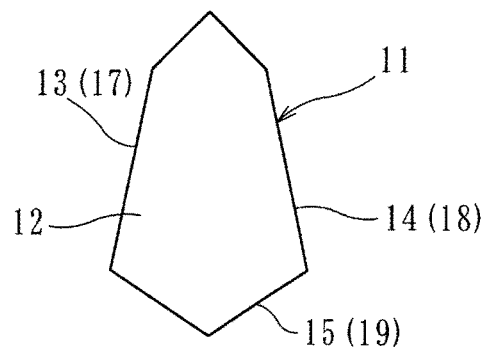
FIG. 14E is a view showing still another alternative of the shape of the projection as viewed in the plan view.
Figure 14F:
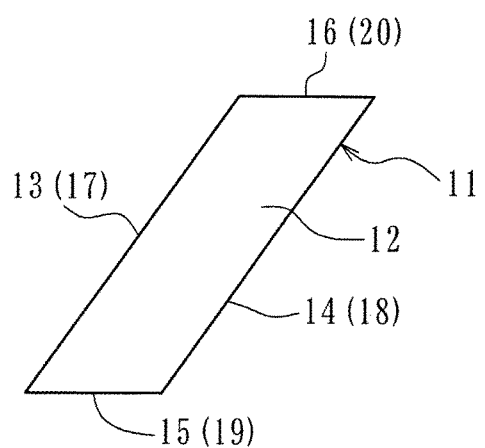
FIG. 14F is a view showing still another alternative of the shape of the projection as viewed in the plan view.

The projection 11 shown in FIG. 14B has a triangular shape as viewed in a plan view where a width hRpo of the projection 11 on an outer end side is set to 0 (zero).

The projection 11 shown in FIG. 14C has a pentagonal shape as viewed in a plan view where, as described previously, the left side edge portion 17 and the right side edge portion 18 are formed of a bent line which is made of a plurality of straight lines, and a width hRpo of the projection 11 on an outer end side is set to 0 (zero).

The projection 11 shown in FIG. 14D has a shape where, as viewed in a plan view, an inner side edge portion 19 is indented toward the outside in a tire radial direction in addition to the left side edge portion 17 and the right side edge portion 18 which are substantially equal to the left side edge portion 17 and the right side edge portion 18 of the projection 11 shown in FIG. 14C. The inner side edge portion 19 of the projection 11 is formed of a bent line which is made of a plurality of straight lines. That is, the inner side edge portion 19 of the projection 11 includes a first portion extending rightward and upward from an inner end of the left side edge portion 17 in a tire radial direction, and a second portion extending leftward and upward from an inner end of the right side edge portion 18 in a tire radial direction.

The projection 11 shown in FIG. 14E has a shape where, as viewed in a plan view, an inner side edge portion 19 projects toward the inside in a tire radial direction in addition to the left side edge portion 17 and the right side edge portion 18 which are substantially equal to the left side edge portion 17 and the right side edge portion 18 of the projection 11 shown in FIG. 14C. The inner side edge portion 19 of the projection 11 is formed of a bent line which consists of a plurality of straight lines. That is, the inner side edge portion 19 of the projection 11 includes a first portion extending rightward and downward from an inner end of the left side edge portion 17 in a tire radial direction, and a second portion extending leftward and downward from an inner end of the right side edge portion 18 in a tire radial direction.

The projection 11 shown in FIG. 14F has a shape where a left side edge portion 17 and a right side edge portion 18 have inclinations in the same direction as viewed in a plan view. The projection 11 has a parallelogram shape where the left side edge portion 17 and the right side edge portion 18 extend parallel to each other, an inclination angle a1 of the left side edge portion 17 satisfies the formula (1), and an inclination angle a3 of the right side edge portion 18 satisfies the formula (2'). The inclination angle a1 of the left side edge portion 17 may satisfy the formula (2), and the inclination angle a3 of the left side edge portion 18 may satisfy the formula (1').

Figure 15:
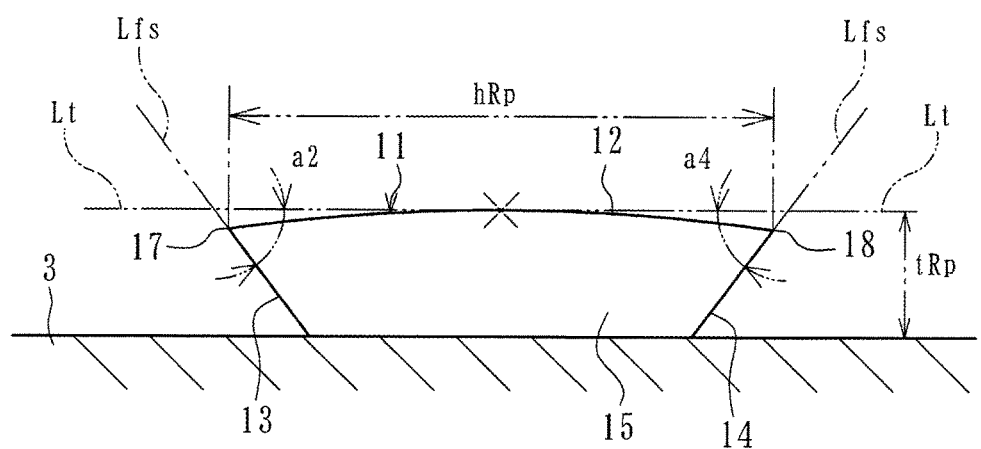
FIG. 15 is a view showing an alternative of the shape of the projection as viewed in an end surface view.

FIG. 15 shows an alternative of the shape of the top surface 12 of the projection 11 as viewed in an end surface view. The projection 11 has an arcuate top surface 12 as viewed in an end surface view.

FIGS. 16A to 17B show various alternatives relating to shapes of a left side surface 13 and a right side surface 14 of the projection 11 as viewed in an end surface view.

The left side surface 13 of each of the projections 11 shown in FIGS. 16A to 16D forms one recess 23 as viewed in an end surface view, and the right side surface 14 of the projection 11 forms one recess 23 as viewed in an end surface view.

Figure 16A:
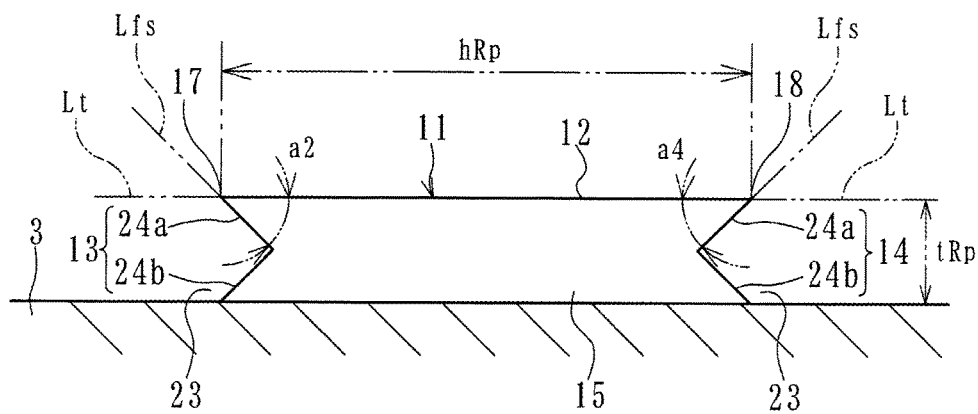
FIG. 16A is a view showing another alternative of the shape of the projection as viewed in the end surface view.

Each of the left side surface 13 and the right side surface 14 of the projection 11 shown in FIG. 16A is formed of two flat surfaces 24a, 24b. As viewed in an end surface view, the flat surface 24a of the left side surface 13 extends rightward and downward, and the flat surface 24b of the right side surface 14 extends leftward and downward. Further, the flat surface 24b of the left side surface 13 extends rightward and upward, and the flat surface 24b of the right side surface 14 extends leftward and upward. Recesses 23 each having a triangular shape as viewed in an end surface view are respectively formed of these flat surfaces 24a, 24b.

Figure 16B:
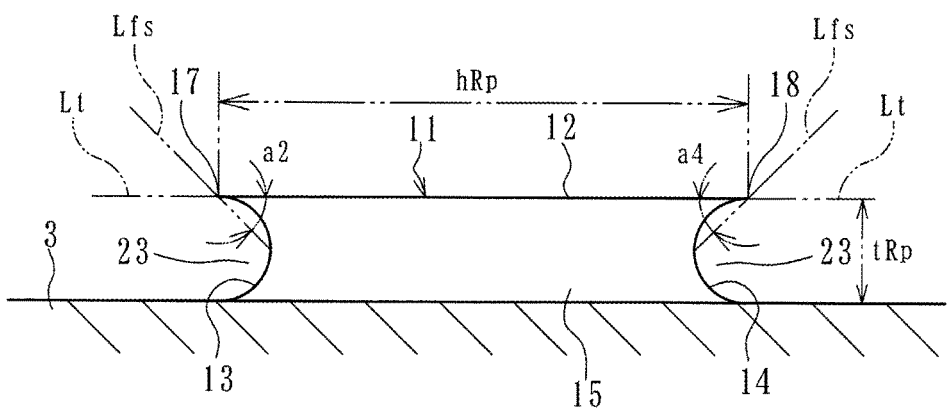
FIG. 16B is a view showing still another alternative of the shape of the projection as viewed in the end surface view.

Each of the left side surface 13 and the right side surface 14 of the projection 11 shown in FIG. 16B is formed of a curved surface having a semicircular cross-sectional shape. Recesses 23 having a semicircular shape as viewed in an end surface view are respectively formed by such a curved surface.

Figure 16C:
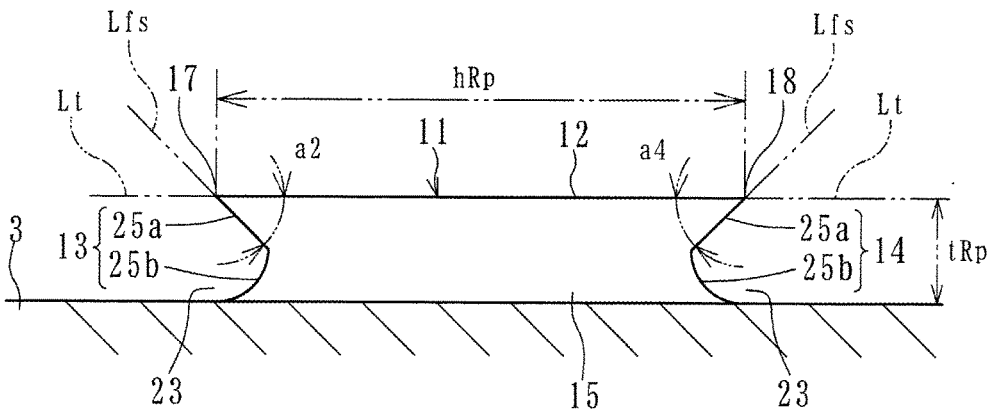
FIG. 16C is a view showing still another alternative of the shape of the projection as viewed in the end surface view.

The left side surface 13 of the projection 11 shown in FIG. 16C is formed of a flat surface 25a extending rightward and downward as viewed in an end surface view, and a curved surface 25b having a circular cross-sectional shape. The right side surface 14 of the projection 11 is formed of a flat surface 25a extending leftward and downward as viewed in an end surface view, and a curved surface 25b having a circular cross-sectional shape. The flat surface 25a is positioned on a top surface 12 side of the projection 11, and the curved surface 25b is positioned on a surface side of the tire side portion 3. Recesses 23 are respectively formed of the flat surface 25a and the curved surface 25b.

Figure 16D:
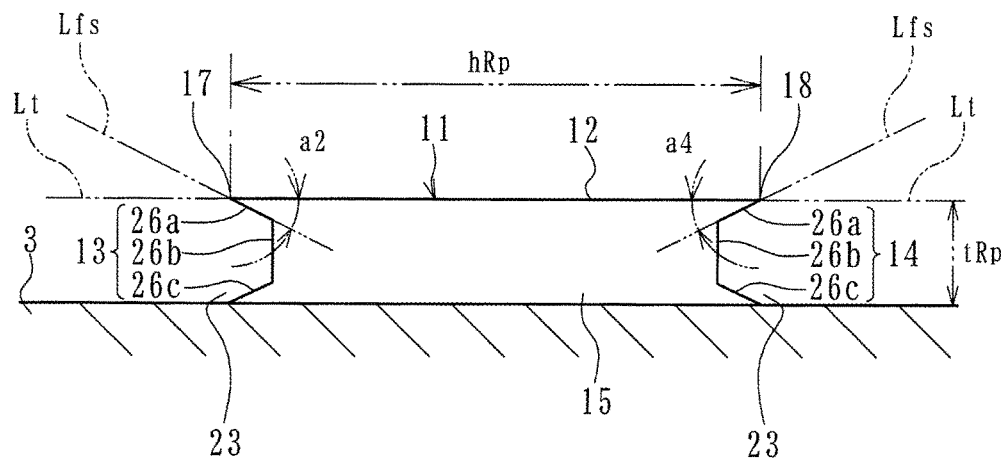
FIG. 16D is a view showing still another alternative of the shape of the projection as viewed in the end surface view.

Each one of the left side surface 13 and the right side surface 14 of the projection 11 shown in FIG. 16D is formed of three flat surfaces 26a, 26b, and 26c. As viewed in an end surface view, the flat surface 26a of the left side surface 13 on a top surface 12 side extends rightward and downward, the flat surface 26c of the left side surface 13 on a surface side of the tire side portion 3 extends rightward and upward, and the flat surface 26b at the center of the left side surface 13 extends in a tire radial direction. The flat surface 26a of the right side surface 14 on a top surface 12 side extends leftward and downward, the flat surface 26c of the right side surface 14 on a surface side of the tire side portion 3 extends leftward and upward, and the flat surface 26b at the center of the right side surface 14 extends in a tire radial direction. Polygonal recesses 23 are respectively formed by these flat surfaces 26a to 26c.

Figure 17A:
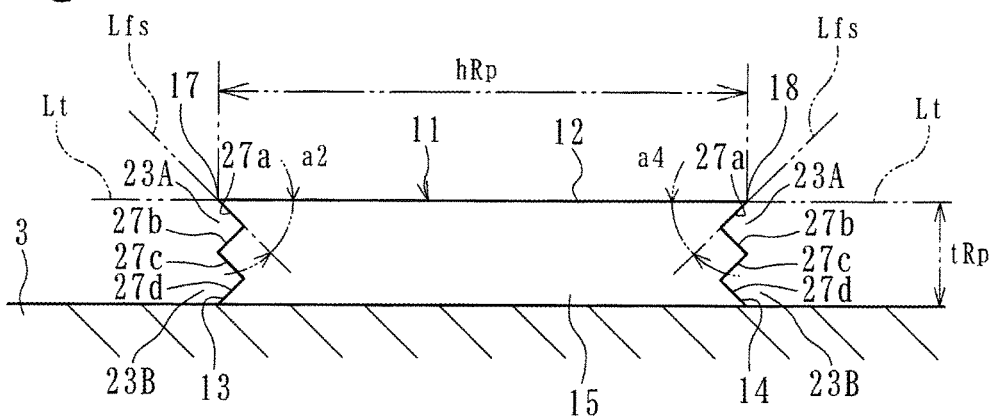
FIG. 17A is a view showing still another alternative of the shape of the projection as viewed in the end surface view.
Figure 17B:
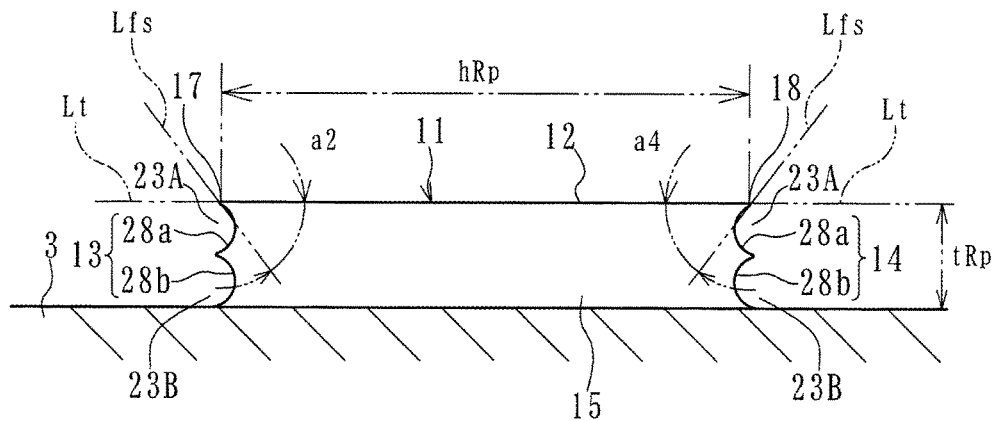
FIG. 17B is a view showing still another alternative of the shape of the projection as viewed in the end surface view.

Each of the left side surface 13 and the right side surface 14 of the projection 11 shown in FIGS. 17A and 17B is formed of two recesses 23A, 23B disposed adjacently to each other in a tire radial direction as viewed in an end surface view.

Each of the left side surface 13 and the right side surface 14 of the projection 11 shown in FIG. 17A is formed of four flat surfaces 27a to 27d. As viewed in an end surface view, the flat surface 27a of the left side surface 13 on a top surface 12 side extends rightward and downward, and the flat surface 27b which extends leftward and downward, the flat surface 27c which extends rightward and downward, and the flat surface 27d which extends leftward and downward are sequentially arranged toward a surface of the tire side portion 3. The flat surface 27a of the right side surface 14 on a top surface 12 side extends leftward and downward, and the flat surface 27b which extends rightward and downward, the flat surface 27c which extends leftward and downward, and the flat surface 27d which extends rightward and downward are sequentially arranged toward a surface of the tire side portion 3. One recess 23A having a triangular cross-sectional shape is formed on the left side surface 13 and the right side surface 14 on a top surface 12 side of the projection 11 by the flat surfaces 27a, 27b respectively, and one recess 23B having substantially the same triangular cross-sectional shape as the recess 23A is formed on the left side surface 13 and the right side surface 14 adjacently to the recess 23A and on a side of a surface of the tire side portion 3 by the flat surfaces 27c, 27d respectively.

Each of the left side surface 13 and the right side surface 14 of the projection 11 shown in FIG. 17B is formed of two curved surfaces 28a, 28b having a semicircular cross-sectional shape respectively.

One recess 23A having a semicircular cross-sectional shape is formed on the left side surface 13 and the right side surface 14 by each of the curved surfaces 28a of the left side surface 13 and the right side surface 14 on a top surface 12 side respectively, and one recess 23B substantially having the same semicircular cross-sectional shape as the recess 23A is formed on the left side surface 13 and the right side surface 14 by the curved surface 28b adjacently to the recess 23A on a surface side of the tire side portion 3 respectively.

The left side surface 13 and the right side surface 14 of the projection 11 may be formed of three or more recesses disposed adjacently to each other in a tire radial direction as viewed in an end surface view.

By properly setting shapes, sizes and the numbers of the recesses formed on the left side surface 13 and the right side surface 14 shown in FIGS. 16A to 17B, it is possible to adjust a flow rate ratio between an air flow AF1 which flows along the top surface 12 of the projection 11 and an air flow AF2 which flows along the left side surface 13 of the projection 11. Further, the shape, the size and the number of the recesses may differ between the left side surface 13 and the right side surface 14.

One projection 11 may be formed by combining the shape of the top surface 12 shown in FIG. 15A and either one of the shape of the left side surface 13 and the shape of the right side surface 14 shown in FIGS. 16A to 17B.

With reference to FIGS. 5, and 15 to 17B, an angle made by the top surface 12 and the left side surface 13 of the projection 11 on the left side edge portion 17, that is, a tip end angle a2 of the projection 11 is defined as an angle made by a straight line Lt which corresponds to the top surface 12 and a straight line Lfs which corresponds to a portion of the left side surface 13 in the vicinity of the left side edge portion 17 as viewed in an end surface view. In the same manner as the tip end angle a2, an angle made by the top surface 12 and the right side surface 14 of the projection 11 on the right side edge portion 18, that is, a tip end angle a4 of the projection 11 is defined as an angle made by the straight line Lt which corresponds to the top surface 12 and a straight line Lfs which corresponds to a portion of the right side surface 14 in the vicinity of the right side edge portion 18 as viewed in an end surface view.

The straight line Lt is defined as a straight line which passes a portion of the top surface 12 having the largest thickness tRp, and extends along a surface of the tire side portion 3. With reference to FIGS. 5, and 16A to 17B, when the top surface 12 is a flat surface extending along a surface of the tire side portion 3, a straight line which is obtained by extending the top surface 12 per se as viewed in an end surface view is the straight line Lt. With reference to FIG. 15, when the top surface 12 is formed of a curved surface, a straight line which passes a position P3 where the top surface 12 has the largest thickness tRp as viewed in an end surface view and extends along a surface of the tire side portion 3 is the straight line Lt.

With reference to FIGS. 5 and 15, when the left side surface 13 and the right side surface 14 are formed of a single flat surface respectively, a straight line which is obtained by extending the left side surface 13 per se or the right side surface 14 per se as viewed in an end surface view is the straight line Lfs. With reference to FIGS. 16A to 16D, when the left side surface 13 and the right side surface 14 are formed of a single recess 23 respectively, a straight line which connects the left side edge portion 17 and the most recessed position of the recess 23 as viewed in an end surface view is the straight line Lfs, and a straight line which connects the right side edge portion 18 and the most recessed position of the recess 23 as viewed in an end surface view is the straight line Lfs. With reference to FIGS. 17A and 17B, when a plurality of recesses 23A, 23B (in this example, two recesses) is formed on the left side surface 13 and the right side surface 14 respectively, a straight line which connects the left side edge portion 17 and the most recessed position of the recess 23A positioned on the most top surface 12 side as viewed in an end surface view is the straight line Lfs, and a straight line which connects the right side edge portion 18 and the most recessed position of the recess 23A positioned on the most top surface 12 side as viewed in an end surface view is the straight line Lfs.

The pneumatic tire 1 of the present invention is characterized in that the left side edge portion 17 and the right side edge portion 18 of the projection 11 have inclinations (inclination angles a1, a3) with respect to the tire radial direction as viewed in a tire width direction, and tip end angles a2, a4 which the top surface 12 and the left and right side surfaces 13, 14 make are set to 100° or less. Accordingly, various variations are considerable with respect to other configurations besides the alternatives described above.

For example, provided that the formation of a laminar flow on the top surface 12 is not outstandingly obstructed, one projection 11 may be divided in a tire circumferential direction by forming longitudinal slits extending in a tire radial direction. Further, provided that the formation of a laminar flow on the top surface 12 is not outstandingly obstructed, one projection 11 may be divided in a tire radial direction by forming lateral slits extending in a tire circumferential direction. Still further, two or more longitudinal slits or lateral slits may be formed on the projection 11.

What is claimed is:

1. A pneumatic tire, comprising a plurality of projections formed on a surface of a tire side portion, wherein
   each of the projection includes a top surface, a first side surface which is one side surface of the projection in a tire circumferential direction, and a second side surface which is the other surface of the projection in the circumferential direction,
   a first side edge portion formed by interconnection of the top surface and the first side surface is inclined to a tire radial direction when viewed from a tire width direction, and a second side edge portion formed by interconnection of the top surface and the second side surface is inclined to the tire radial direction when viewed from the tire width direction, and
   a first tip end angle which is an angle formed by the top surface and the first side surface at the first side edge portion and a second tip end angle which is an angle formed by the top surface and the second side surface at the second side edge portion are respectively equal to or smaller than 100°, wherein
   the first side edge portion and the second side edge portion are symmetrical with each other with respect to a straight line passing a center of a width of the projection, which is a size of the top surface in the tire circumferential direction, and extended in the radial direction,
   the projection includes an inner end surface which is an end surface at an inner side in the tire radial direction, and an outer end surface which is an end surface at an outer side in the tire radial direction
   a width of the projection which is a size of the top surface at a side of the inner end surface is larger than a width of the projection which is a size of the top surface at a side of the outer end surface,
   the surface of a tire side portion between the adjacent two projections is flat without ribs, wherein
   an inclination angle a1 of the first side edge portion from the inner side in the tire radial direction when viewed in the tire width direction satisfies the following:

$23° \leq a1 \leq 43°$, and an inclination angle a3 of the second side edge portion from the outer side in the tire radial direction when viewed in the tire width direction satisfies the following:

$113° \leq a3 \leq 133°$, wherein the top surface has an arcuate shape.

2. The pneumatic tire according to claim 1, wherein
   the first side edge portion is inclined to a right side from an inner end of the tire radial direction to an outer end of the tire radial direction when viewed from the tire width direction, and
   the second side edge portion is inclined to a left side from the inner end of the tire radial direction to the outer end of the tire radial direction.

3. The pneumatic tire according to claim 2, wherein the width of the projection is gradually decreased from the side of the inner end surface to the side of the outer end surface.

4. The pneumatic tire according to claim 1, wherein the width of the projection is gradually decreased from the side of the inner end surface to the side of the outer end surface.

5. The pneumatic tire according to claim 1, wherein the first tip end angle and the second tip end angle are smaller than 90°.

6. The pneumatic tire according to claim 1, further comprising an inner side edge portion formed by interconnection of the top surface and the inner end surface, and an outer side edge portion formed by interconnection of the top surface and the outer end surface.

7. The pneumatic tire according to claim 1, wherein the first side surface and the second side surface each are formed of a first flat surface and a second flat surface.

8. The pneumatic tire according to claim 7, wherein when viewed in an end surface view, the first flat surface of the first side surface extends rightward and downward, and the second flat surface of the first side surface extends rightward and upward.

* * * * *